United States Patent [19]

Dyroff et al.

[11] 4,226,960

[45] Oct. 7, 1980

[54] PROCESS FOR THE PREPARATION OF POLYMERIC ACETAL CARBOXYLATES

[75] Inventors: David R. Dyroff, Creve Coeur; Victor D. Papanu, Maryland Heights, both of Mo.

[73] Assignee: Monsanto Company, St. Louis, Mo.

[21] Appl. No.: 86,895

[22] Filed: Oct. 22, 1979

[51] Int. Cl.$^3$ .................... C08F 283/06; C08L 61/02
[52] U.S. Cl. ................................ 525/401; 525/398; 528/494
[58] Field of Search ................ 525/398, 401; 528/494

[56] References Cited

U.S. PATENT DOCUMENTS

| | | | |
|---|---|---|---|
| 4,140,676 | 2/1979 | Crutchfield et al. | 525/398 |
| 4,144,226 | 3/1979 | Crutchfield et al. | 525/401 |
| 4,146,495 | 3/1979 | Crutchfield et al. | 252/89 R |

Primary Examiner—Lucille M. Phynes

Attorney, Agent, or Firm—S. M. Tarter; W. H. Duffey; F. D. Shearin

[57] ABSTRACT

The alkali metal, ammonium and alkanol ammonium salts of polymeric acetal carboxylates are stable detergent builders under laundry use conditions but depolymerize at lower pH, making the polymer fragments more readily biodegradable in waste streams. Such polymeric acetal carboxylates can now be made by an improved process which includes the steps of bringing together in a reaction zone under polymerization conditions an ester of glyoxylic acid and a polymerization initiator, and adding an alkyl vinyl ether to the resulting polymer in the presence of a solvent having a dielectric constant of at least 15, such as an alkyl nitrile and a haloacetic acid catalyst, such as trifluoroacetic acid, to stabilize the polymer against rapid depolymerization in alkaline solution. The preferred solvent is acetonitrile.

13 Claims, No Drawings

PROCESS FOR THE PREPARATION OF POLYMERIC ACETAL CARBOXYLATES

BACKGROUND OF THE INVENTION

This invention relates to an improved method of preparing polymeric acetal carboxylates, which are useful as complexing agents and detergency builders.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STPP) has been found to be a highly efficient cleaning and detergency builder and this compound has been widely used for decades in cleaning formulations. Indeed, millions of pounds of STPP are used each year in cleaning formulations because of its superior builder qualities. However, because of the recent emphasis on removing phosphates from detergent and cleaning compositions for environmental reasons, the detergent and cleaning industry is now looking for materials suitable for use as builders which do not contain phosphorus and which are environmentally acceptable.

Polymeric acetal carboxylates have been found to be suitable as a replacement for STPP in detergent compositions. The composition of such polymeric acetal carboxylates has been disclosed in U.S. Pat. No. 4,144,226 issued Mar. 13, 1979 and in Ser. No. 962,512 filed Nov. 20, 1978. The use of such polymeric acetal carboxylates in detergent compositions is disclosed in U.S. Pat. No. 4,146,495 issued Mar. 27, 1979. A preferred method for the saponification of the esters of the polymeric acetal carboxylates to form the corresponding alkali metal salts is disclosed in U.S. Pat. No. 4,140,676 issued Feb. 20, 1979. The polymeric acetal carboxylate salts described in the above applications and patents were tested for sequestration function using the procedures described by Matzner et al in "Organic Builder Salts as Replacements for Sodium Tripolyphosphate", TENSIDE, 10, No. 3, pages 119-125 (1973). As a result of such tests, the polymeric acetal carboxylate salts were found to be superior detergent builders compared to STPP, and were stable under laundry use conditions but depolymerized at lower pH making the polymers more readily biodegradable.

Although the methods for preparing the polymeric acetal carboxylates disclosed in the above patents and patent applications are satisfactory, there is a need for improved processes to prepare such materials to achieve greater efficiencies. Now, according to the present invention, an improved process for preparing the polymeric acetal carboxylates has been developed to add to the polymer termini an end group derived from alkyl vinyl ether which will stabilize the polymer against rapid depolymerization in alkaline solution. According to the present process, the amount of alkyl vinyl ether to provide the end group to stabilize the polymer against rapid depolymerization in alkaline solution is significantly reduced over the amount required to stabilize the polymer using prior art processes. Hence, according to the process of the present invention, greater efficiencies are achieved over prior art processes.

SUMMARY OF THE INVENTION

These and other advantages are achieved in a process wherein an ester of glyoxylic acid is polymerized and an alkyl vinyl ether containing 1 to about 20 carbon atoms in the alkyl group is added to the resulting polymer in the presence of a haloacetic acid to stabilize the polymer against rapid depolymerization in alkaline solution; the improvement which comprises adding the alkyl vinyl ether in the presence of a miscible solvent having a dielectric constant of at least about 15.

For the purposes of this invention, the term "rapid depolymerization in alkaline solution" as it is used in the specification and claims, shall mean that in an aqueous solution of 0.5 molar sodium hydroxide containing 10 grams per liter of the polymer of the present invention, the average chain length of the polymer will be reduced by more than 50 percent, as determined by Proton Magnetic Resonance, after 1 hour at 20° C.

Broadly described, the polymeric acetal carboxylates can be prepared by the present process by bringing together in a reaction zone under polymerization conditions an ester of glyoxylic acid and a polymerization initiator, and optionally one or more comonomers, to form a polymer believed to have the following empirical formula:

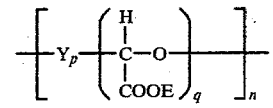

wherein Y is one or more comonomers randomly distributed along the polymer chain selected from the group consisting of alkylene oxides and aldehydes having up to 20 carbon atoms; n averages at least 4; p is 0 to an average of about 5; q is at least 1; and E is an alkyl group having 1 to about 4 carbon atoms. Thereafter, there is added an alkyl vinyl ether to the resulting polymer in the presence of an endcapping catalyst and miscible solvent having a dielectric constant of at least about 15 to provide a chemically stable end group derived from the alkyl vinyl ether, which stabilizes the polymer against rapid depolymerization in alkaline solution. Then, the polymeric ester can be saponified to the corresponding polymeric alkali metal salt by contacting the polymeric ester with an alkali metal hydroxide.

Any number of esters of glyoxylic acid can be used as one starting material to prepare the polymeric acetal carboxylates. The hemiacetal form of the esters can be made by the reaction of an alcohol containing from 1 to 4 carbon atoms with an acid hemiacetal or acid hydrate under conditions known to those skilled in the art. Suitable esters include those having from 1 to about 4 carbon atoms in the alkoxy group, such as methyl, ethyl, propyl, isopropyl, butyl, isobutyl and the like. Other esters of glyoxylic acid can also be used, provided that the particular ester does not interfere with the polymerization, cause the polymer of the present invention to undergo rapid depolymerization in alkaline solution, or interfere with the intended function of the polymer as a chelant, sequestrant or detergent builder, and such esters of glyoxylate are equivalent for purposes of this invention. Methyl and ethyl esters are preferred. Thereafter, the resulting ester hemiacetal can be converted to the corresponding aldehyde ester by any number of techniques known to those skilled in the art, such as the reaction of the ester hemiacetal with phosphorus pentoxide according to the following general equation:

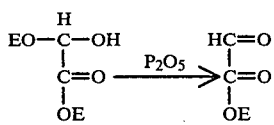

where E is an alkyl group having 1 to 4 carbon atoms.

Any number of comonomers known to those skilled in the art optionally can be copolymerized with the aldehyde ester to form a polymer product of the present invention. It is only necessary that the comonomer does not inhibit polymerization or cause the polymer product to undergo rapid depolymerization in alkaline solution. Suitable comonomers include: alkylene oxides, such as ethylene oxide, propylene oxide, epihalohydrin, epoxysuccinate and the like; aldehydes such as formaldehyde, acetaldehyde, as well as aldehydes containing up to 12 carbon atoms, and the like. Comonomers having from 1 to 4 carbon atoms, such as ethylene oxide, formaldehyde or acetaldehyde are preferred.

Mixtures of comonomers can be polymerized with the aldehyde ester to form a terpolymer, or even a more complex polymeric structure. For example, mixtures of the same class of comonomers, such as a mixture of epoxy compounds like ethylene oxide and propylene oxide, can be copolymerized with the aldehyde ester to form a terpolymer. Numerous other examples will occur to those skilled in the art in view of the present disclosure, such as a mixture of ethylene oxide and formaldehyde.

The number of carboxylate groups in the polymer product of the present invention is important since the number of carboxylate groups affects the usefulness of the corresponding polymer salt as a chelant, sequestrant and detergent builder. Hence, the nature of the comonomer or comonomers (i.e., the nature of Y), the mole ratio of comonomer to aldehyde ester (i.e., the ratio of p and q) and the number of repeating units in the polymer of the present invention (i.e., the average value of n) are each interrelated and important since they affect the number of carboxylate groups in the polymer.

Although there is theoretically no upper limit to the ratio of the moles of comonomer or comonomers to the moles of acetal carboxylate segments in the polymer, when the mole ratio of acetal carboxylate segments to comonomer is less than about 1:5 (i.e., q is 1 and p averages about 5), the polymer salt loses much of its effectiveness as a chelant, sequestrant and detergent builder. It is preferred that the mole ratio of acetal carboxylate to comonomer is at least about 1:1 (i.e., p and q are each about 1) or higher, say 5:1 or even 50:1 (i.e., p is 1 and q is at least about 5, say 50). Of course, the polymer salt is most effective as a chelant, sequestrant and detergent builder when a comonomer is not present, i.e., when p equals 0. On the other hand, the comonomers can frequently provide special properties to the polymer, e.g., improved biodegradability. Thus, when a comonomer is desirable, a relatively small comonomer that does not disperse the acetal carboxylate groups too widely or inhibit chelation by steric hindrance, such as ethylene oxide or formaldehyde, is preferred.

The number of repeating units, i.e., the average value of n, in the polymer is also important, since the effectiveness of the polymer salt as a chelant, sequestrant and detergency builder is affected by the average chain length. Even when the polymer averages only four repeating units (i.e., n averages 4), the polymer shows some effectiveness as a sequestrant, chelating agent and builder. Although there is no theoretical limit to the number of repeating units, which can average as high as 400, or even higher, there does not seem to be an advantage to having a polymer with an average of more than about 200 repeating units. When the average number of repeating units exceeds about 100, significant improvement in sequestration, chelation and builder properties is not observed. Thus, it is preferred that the polymer product contain an average between about 10 and about 200 units, and even more preferred that the polymer product contains an average between about 50 and about 100 repeating units in the chain.

Any number of initiators can be used to polymerize the aldehyde ester. Suitable initiators include 2-hydroxy pyridine-$H_2O$ complex, triethyl amine, boron trifluoride etherate, 3 A molecular sieves, and the like. Even traces of hydroxy ion or cyanide ion will trigger the polymerization. Compounds such as dialkyl sodiomalonate or sodiomethylmalonate esters have been used with good results, and are preferred for use in the process of the present invention.

The polymerization conditions can vary within wide limits. The temperature at the beginning of polymerization can vary between about $-70°$ C. to about $50°$ C., although satisfactory results are obtained between $-20°$ C. and about $20°$ C. The temperature rise after the polymerization is initiated is not critical, although it is preferred to prevent a temperature rise of more than about $50°$ C. Satisfactory results are obtained at atmospheric pressure although higher or lower pressures could be used.

Any number of miscible solvents can be included in the reaction zone during polymerization to aid agitation. Suitable solvents include alkyl nitriles having 1 to 4 carbon atoms or more in the alkyl group, such as acetonitrile. Other suitable solvents include dimethyl sulfoxide, acetone, methylene chloride, tetrahydrofuran, ethyl acetate and the like. It is only necessary that the solvent does not interfere with the polymerization, and can be separated from the resulting polymer with relative ease. Solvents having a dielectric constant of at least 15, such as the alkyl nitriles like acetonitrile, are preferred since they are used in subsequent steps in the process of the present invention, and as will occur to those skilled in the art, it is preferred to minimize the number of solvents used in the process.

According to the improved process of the present invention, after the aldehyde ester has been polymerized, with or without a comonomer as discussed above, a sufficient amount of an alkyl vinyl ether is added to the resulting polymer in the presence of a haloacetic acid catalyst and a solvent having a dielectric constant of at least 15 to add an end group derived from the alkyl vinyl ether to the polymer termini to stabilize the polymer against rapid depolymerization in an alkaline solution.

Suitable endcapping catalysts to be used in the improved process of the present invention include haloacetic acids, such as trifluoroacetic acid, trichloroacetic acid and the like, which provide superior results. Trifluoroacetic acid is preferred for use in the process of the present invention.

The solvents useful in the improved process of the present invention during the step to add a chemically stable group to the polymer termini are those known to the art. It is only necessary that the solvent is miscible with the unstabilized polymer, does not enter into side reactions with the polymer, the endcapping catalyst or the alkyl vinyl ether, and has a dielectric constant of at least about 15. It was surprisingly found that while other useful solvents for the endcapping reaction, such as methylene chloride and the like, give comparable results when the level of alkyl vinyl ether is relatively high, e.g., 0.3 mole of alkyl vinyl ether per mole of aldehyde ester monomer charged to the reaction zone, the solvents used in the improved process of the present invention permit the use of much less alkyl vinyl ether. Suitable solvents include dimethyl sulfoxide, acetone and the like. It is preferred to use alkyl nitriles having 1 to about 4 carbon atoms in the alkyl group, or more, although there does not seem to be a particular advantage in using alkyl nitriles of higher molecular weight. Acetonitrile is especially preferred.

The conditions for adding the chemically stable group to the polymer termini according to the improved process of the present invention can vary within wide limits depending on the desired average chain length and molecular weight distribution. The unstabilized polymer is in equilibrium with the monomer, and the lower temperatures favor the formation of the polymer. Consequently, endcapping at lower temperatures provides a polymer with a higher average chain length. In addition, temperature control during endcapping will influence molecular weight distribution since wide fluctuations in temperature during the endcapping reaction will produce greater variations in the molecular weight distribution. To produce a polymer suitable for detergent applications, it is preferred to maintain the temperature range at the beginning of the reaction from about $-10°$ C. to about $10°$ C., and to limit the temperature rise during the endcapping step to about $20°$ C. Satisfactory results are obtained at atmospheric pressure although higher or lower pressures could be used as will occur to those skilled in the art.

The amount of haloacetic acid, for example trifluoroacetic acid, to act as a catalyst during the endcapping reaction can vary from about 0.01 mole to about 0.04 mole per mole of aldehyde ester. No particular benefit can be seen by using more than 0.04 mole of haloacetic acid but the use of haloacetic acid levels at lower than 0.01 mole per mole of aldehyde ester reduced the yield of polymer product that was stable against rapid depolymerization in alkaline solution. It is preferred to use between about 0.015 and 0.020 mole of haloacetic acid per mole of aldehyde ester in the process of the present invention.

The amount of solvent for use at this step of the process to add the chemically stable group at the polymer termini can vary within wide limits. It is only necessary that there is sufficient solvent to permit efficient agitation and to permit efficient utilization of the alkyl vinyl ether during such endcapping reaction. Satisfactory results are achieved when as little as one volume of solvent is used for each 10 volumes of resulting polymerized aldehyde ester. It is preferred to use from about ½ to about 1 volume of solvent for each volume of polymerized aldehyde ester. When greater volumes of solvent are present, the reaction volume can become too large, and such larger amounts of solvent are unnecessary. As noted above, some or all of the solvent during this endcapping step can already be present from the polymerization step with the resulting polymer.

The rate of addition and the sequence of addition of the alkyl vinyl ether and the haloacetic acid catalyst can affect the chain length and/or yield of the resulting polymer product. When the alkyl vinyl ether is added in portions over an extended period of time, the yield of polymer product is low and the resulting polymer product has poor sequestration values. Hence, it is preferred to add the alkyl vinyl ether over a short period of time. Further, adding the alkyl vinyl ether before the haloacetic acid catalyst is added to the polymerized aldehyde ester caused a reduction in the chain length of the resulting material. Hence, in the preferred process the haloacetic acid is added to the resulting polymerized aldehyde ester at $-10°$ C. to $0°$ C., followed by the addition of the alkyl vinyl ether about 30 minutes later at $10°$ C. Optionally following the addition of the haloacetic acid and before the addition of the alkyl vinyl ether, the polymer can be contacted with an immiscible solvent to obtain a polymer of greater purity as described in copending application C43-4564, filed concurrently herewith.

Suitable alkyl vinyl ethers include methyl vinyl ether, ethyl vinyl ether, propyl vinyl ether, isopropyl vinyl ether, isobutyl vinyl ether and the like. Even vinyl ethers having up to 20 carbon atoms in the alkyl group, such as octadecyl vinyl ether, can be used, although it is preferred to use alkyl vinyl ethers having 1 up to about 6 carbon atoms in the alkyl group, such as the methyl, ethyl or propyl vinyl ethers. Ethyl vinyl ether is especially preferred.

The stabilized polymer ester is useful as an intermediate to prepare the corresponding alkali metal, ammonium or alkanol amine salts. It is only necessary to saponify the stabilized polymer ester with a base, such as lithium hydroxide, sodium hydroxide, potassium hydroxide and the like, using conventional saponification techniques to make a corresponding alkali metal salt suitable for use as a builder and as a sequestrant. The ammonium or alkanol amine salts can be prepared from the corresponding alkali metal salts using conventional ion exchange techniques.

The amount of polymer salt required to effectively complex the ions in a given system will depend to some extent on the particular polymer salt being used and the particular metal ion in solution. Because the polymer tends to depolymerize in acid media, effective complexing is limited to neutral or preferably basic solution. Optimum conditions and amounts of the polymer salt to be used can readily be determined by routine experimentation.

The polymer salts are also useful as builders in detergent formulations. Since the pH of the detergent solution is usually between pH 9 and pH 11, the polymer salts will not depolymerize rapidly when used as a detergent builder in aqueous solution at normal use concentrations (about 1200–1500 ppm formulation in the wash water), temperatures ($10°$–$60°$ C.) and times (i.e., about 15 minutes) typical of United States home laundry practices. Generally, the use of the alkali metal salts, particularly the sodium salt, is preferred. However, in some formulations where greater builder solubility is required, the use of ammonium or alkanol amine salts may be desirable.

The detergent formulations will contain at least 1 percent by weight and preferably at least 5 percent by weight of the polymer salts. In order to obtain the maximum advantages of the polymer salts as builders, the detergent should preferably contain from about 5 percent to about 75 percent of these salts. The polymer salts can be the sole detergency builder, or the polymer salts can be utilized in combination with other detergency builders which may constitute from 0 to 95 percent by weight of the total builders in the formulation. The amount and choice of builder, surfactant and other detergent ingredients, such as optical brighteners, fillers, bleaches, dyes, soil antiredeposition agents, perfumes and the like, will be in accordance with well understood practices of detergent formulation.

DESCRIPTION OF THE PREFERRED EMBODIMENTS

This invention is illustrated by, but not limited to, the following Examples wherein all percentages are by weight unless otherwise noted.

EXAMPLE I

This Example illustrates the preparation of the anhydrous ester aldehyde useful to prepare the polymers of the present invention.

A 2-liter, 4-necked, round bottom flask equipped with an overhead stirrer, thermometer and 30 centimeter Vigreaux column and take-off head, is charged with 1200 grams (10 moles) of methyl glyoxylate methyl hemiacetal. A total of 568 grams of phosphorus pentoxide (4 moles) is added in 4–6 portions, keeping the reaction temperature below 90° C. The addition requires about 90 minutes. When the addition is complete, the mixture is stirred until the temperature has fallen to about 70° C. (0.5 hour). The mixture is distilled at aspirator vacuum (20–40 torr) yielding 764 grams crude methyl glyoxylate having a boiling point of 56°–61° C.; the distillation is stopped when the pot temperature reaches 125° C. Chromatographic analysis of this crude material indicates 86.6 percent glyoxylate, 9.3 percent methyl dimethoxyacetate, 3.3 percent dimethyl oxalate and trace amounts of unidentified products.

The crude product is then distilled from 25 grams of 3 A molecular sieves (which had been heated to about 125° C. to drive off residual moisture and organics) through the Vigreaux column. A 15-gram forecut of about 97 percent pure glyoxylate is collected initially. The Vigreaux column is replaced by a 30.5 centimeter Widmer column and 521 grams of 99 percent pure polymerizable grade methyl glyoxylate is collected having a boiling point of 83°–84° C. at 210 torr. A final cut of 36 grams (93 percent pure) ester is collected in a final fraction (91°–94° C.; 210 torr). The overall yield of polymerizable glyoxylate is 59 percent from the hemiacetal.

The polymerizable glyoxylate is stored in a glass-stoppered bottle at −70° C. until ready for use.

EXAMPLE II

This Example illustrates the preferred process of the present invention.

To a 100 milliliter, 3-necked, round bottom flask equipped with an efficient stirrer and a thermometer is added 5.3 milliliters of acetonitrile and 24.7 grams (0.281 mole) of aldehyde ester from Example I. The temperature of the mixture is lowered to −10° C. using a methanol-ice bath, and 0.07 milliliter of 0.05 molar sodiodiethyl methylmalonate in acetonitrile is added. Polymerization is rapid and exothermic and the temperature rises to about 20° C. Stirring and cooling are continued. About 30 minutes later with the temperature again at −10° C., 0.307 milliliter (0.0042 mole) of trifluoroacetic acid is added and stirring is continued for another 45 minutes. The solution is allowed to warm to room temperature and is then extracted for 2 to 3 minutes for 3 times with 25 milliliter portions of 2:1 toluene/petroleum ether mixture. The upper hydrocarbon extract is decanted from the polymerized aldehyde ester.

Then, 13.5 milliliters of acetonitrile and 0.26 milliliter of trifluoroacetic acid are added to the resultant gum. After about 10 minutes, 2 milliliters (0.021 mole equivalent to 0.075 mole per mole of monomer present) of ethyl vinyl ether is added and the solution stirred for 90 minutes at room temperature. The solution is washed four times with 20 milliliter portions of 3:1 diethyl ether/petroleum ether for 10 minutes each wash, followed by one 15 minute wash with 40 milliliters of 0.5 molar NaOH which is also decanted. Then, 45 milliliters of 7 molar NaOH is added dropwise to the stabilized methyl ester polymer over a period of about 15 minutes while controlling the temperature to less than 45° C. The slurry is cooled to room temperature and stirred for 3 hours. About 30 milliliters of methanol are added and the slurry is stirred for an additional 0.5 hour. The precipitate is separated by filtration and dried in a vacuum oven at 35° C. for 12 hours.

Twenty-one grams of material are obtained for a yield of 71 percent, based on the amount of aldehyde ester. Analysis by Proton Nuclear Magnetic Resonance indicates that the chain length averages about 200 units. A sample of the polymer is tested for sequestration function using the procedure described by Matzner et al, "Organic Builder Salts as Replacements for Sodium Tripolyphosphate", TENSIDE, 10, No. 3, pages 119-125 (1973). The sequestration of calcium ions and magnesium ions as a percent of STPP performance shows that the polymer salt is about 128 percent of STPP.

EXAMPLE III

This Example illustrates the improved results that are achieved using solvents with high dielectric constants, especially acetonitrile, the preferred solvent.

The general procedure of Example II is repeated except that different solvents are used for the endcapping reaction, the amount of ethyl vinyl ether used is 0.2 mole per mole of aldehyde ester monomer charged, and the intermediate stabilization with trifluoroacetic acid followed by extracting the polymer with toluene/petroleum ether is omitted. The results are presented below, and they clearly show that solvents with high dielectric constants provide superior products.

TABLE 1

| Solvent | Dielectric Constant | $DP_n \pm 3$ Units | Yield % | % STP |
|---|---|---|---|---|
| Acetonitrile | 38.0 | 99 | 88 | 148 |
| Acetone | 20.7 | 58 | 94 | 128 |

TABLE 1-continued

| Solvent | Dielectric Constant | $DP_n \pm 3$ Units | Yield % | % STP |
|---|---|---|---|---|
| Methylene Chloride | 9.1 | 112 | 73 | 84 |
| Tetrahydrofuran | 7.9 | 75 | 54 | 62 |
| Ethyl Acetate | 6.0 | 58 | 70 | 71 |

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. In a process wherein an ester of glyoxylic acid is polymerized, and an alkyl vinyl ether containing 1 to about 20 carbon atoms in the alkyl group is added to the resulting polymer in the presence of a haloacetic acid to stabilize the polymer against rapid depolymerization in alkaline solution; the improvement which comprises: adding the alkyl vinyl ether in the presence of a miscible solvent having a dielectric constant of at least about 15.

2. In a process of claim 1 wherein the haloacetic acid is trifluoroacetic acid.

3. In a process of claim 1 or 2 wherein the alkyl vinyl ether contains from 1 to about 6 carbon atoms in the alkyl group.

4. In a process of claim 1 or 2 wherein the alkyl vinyl ether is ethyl vinyl ether.

5. In a process of claim 1 or 2 wherein the solvent is an alkyl nitrile having 1 to about 4 carbon atoms in the alkyl group.

6. In a process of claim 1 or 2 wherein the solvent is acetonitrile.

7. In a process of claim 2 wherein the alkyl vinyl ether contains from 1 to about 6 carbon atoms in the alkyl group, and the solvent is an alkyl nitrile having 1 to about 4 carbon atoms in the alkyl group.

8. In a process of claim 7 wherein from about 0.1 to about 1 volume of solvent is present for each volume of resulting polymer.

9. In a process of claim 7 wherein from about ⅓ to about 1 volume of solvent is present for each volume of resulting polymer.

10. In a process of claim 8 wherein the solvent is acetonitrile and the alkyl vinyl ether is ethyl vinyl ether.

11. In a process of claim 8 wherein from about 0.05 mole to about 0.25 mole of ethyl vinyl ether is used per mole of ester of glyoxylic acid.

12. In a process of claim 8 wherein the stabilized polymer is saponified to the corresponding alkali metal salt.

13. In a process of claim 8 wherein the stabilized polymer is saponified to the corresponding sodium salt.

* * * * *